US005838564A

United States Patent [19]
Bahorich et al.

[11] Patent Number: 5,838,564
[45] Date of Patent: Nov. 17, 1998

[54] APPARATUS FOR SEISMIC SIGNAL PROCESSING AND EXPLORATION

[75] Inventors: Michael S. Bahorich, Arvada, Colo.; Steven L. Farmer, Tulsa, Okla.

[73] Assignee: Amoco Corporation, Chicago, Ill.

[21] Appl. No.: 716,612

[22] Filed: Oct. 1, 1996

Related U.S. Application Data

[63] Continuation of Ser. No. 353,934, Dec. 12, 1994, Pat. No. 5,563,949.

[51] Int. Cl.$^6$ ..................................................... G06F 19/00
[52] U.S. Cl. ............................................................. 364/421
[58] Field of Search ................................... 364/421, 422; 367/14, 40, 41, 42, 71, 72

[56] References Cited

U.S. PATENT DOCUMENTS

| | | | |
|---|---|---|---|
| H374 | 11/1987 | Abo-Zena et al. | 342/378 |
| 3,599,175 | 8/1971 | Hollingsworth et al. | 340/15.5 AC |
| 3,614,623 | 10/1971 | McAuliffe | 325/42 |

(List continued on next page.)

FOREIGN PATENT DOCUMENTS

| | | |
|---|---|---|
| 0181216 | 7/1985 | European Pat. Off. . |
| 0172065 | 8/1963 | Russian Federation ................. 367/40 |
| 2066467 | 7/1981 | United Kingdom . |

OTHER PUBLICATIONS

Bahorich, Michael S., Amoco Production Research and Bridges, S. Rutt, Advance Geophysical Case Histories 1: Seismic Stratigraphy/Seismic Sequence Attribute Map (SSAM) CH1.1, Oct. 26, 1992; SEG New Orleans The Society of Exploration Geophysicists Sixty–Second Annual International Meeting & Exposition, Oct. 25–29, 1992.

Yanovskiy, A.K., and Bogolyubskiy A.D., "Sposob avtomaticheskoy approksimatsii vertikal'nogo godografa, osnovannyy na posledova–Tel'nom vydelenii plastov" in *Prikladnaya geofizika*, No. 82, 1976; pp. 95–100. (Translation from Russian).

Bahorich, Mide and Farmer, Steve; 3–D seismic discontinuity for faults and stratigraphic features: The Coherence Cube, *The Leading Edge*, The Society of Exploration Geophysicists ISN 1070–485X Oct. 1995, pp. 1053–1058.

Neidell, N.S. and Taner, M. Turhan; "Semblance and Other Coherency Measures for Multichannel Data", *Geophysics*, vol. 36, No. 3 (Jun. 1971), pp. 482–497, 6 FIGS.

Vossler, Donald A., Landmark Graphics Corp., Automatic Whole Section Seismic Reflection Mapping: The Society of Exploration Geophysicists Sixy–Second Annual International Meeting & Exposition, 1988.

Vossler, Donald A., Landmark Graphics Corp., Automatic Declination of Lateral Facies Changes in Clatic Environments; SEG Dallas The Society of Exploration Geophysicists Fifty–Ninth Anuual International Meeting & Exposition, Oct. 29–Nov. 2, 1989.

Tanner, M.T., Koehler, F. And Sheriff, R.E., Complex Seismic Trace Analysis, *Geophysics*, vol. 44, No. 6 (Jun. 1979), pp. 1041–1063, 16 FIGS, 1 table.

*Primary Examiner*—Donald E. McElheny, Jr.
*Attorney, Agent, or Firm*—James A. Gabala; Robert E. Sloat

[57] ABSTRACT

An apparatus for the exploration of hydrocarbons by obtaining a set of seismic signal traces distributed over a predetermined three-dimensional volume of the earth and using a computer to: divide the three-dimensional volume into a plurality of vertically stacked and generally spaced apart horizontal slices; divide each of the slices into a plurality of cells having portions of at least three seismic traces located therein; measure the cross-correlation between one pair of traces lying in one vertical plane to obtain an in-line value and the cross-correlation between another pair of traces lying in another vertical plane to obtain a cross-line value; and combine the in-line value and the cross-line value to obtain one coherency value for each of the cells; and display the coherency values.

20 Claims, 5 Drawing Sheets

U.S. PATENT DOCUMENTS

| | | | |
|---|---|---|---|
| 3,622,967 | 11/1971 | Foster et al. | 340/15.5 MC |
| 3,638,178 | 1/1972 | Stephenson | 340/15.5 |
| 3,714,621 | 1/1973 | Waters | 340/15.5 |
| 3,787,855 | 1/1974 | Cragon et al. | 343/17.1 R |
| 3,931,609 | 1/1976 | Anstey | 340/15.5 |
| 3,961,306 | 6/1976 | Anstey | 340/15.5 |
| 4,223,399 | 9/1980 | Hackett | 367/41 |
| 4,279,026 | 7/1981 | Lambright et al. | 340/15.5 |
| 4,298,968 | 11/1981 | Ruehle et al. | 367/59 |
| 4,393,488 | 7/1983 | Gassaway et al. | 367/75 |
| 4,403,312 | 9/1983 | Thomason | 181/108 |
| 4,467,461 | 8/1984 | Rice | 367/71 |
| 4,503,527 | 3/1985 | Pann | 367/38 |
| 4,633,400 | 12/1986 | Chittineni | 364/421 |
| 4,661,935 | 4/1987 | Shock et al. | 367/47 |
| 4,683,556 | 7/1987 | Willis | 367/27 |
| 4,695,984 | 9/1987 | Paal | 367/54 |
| 4,713,775 | 12/1987 | Scott et al. | 364/513 |
| 4,729,101 | 3/1988 | Hanson et al. | 364/421 |
| 4,736,347 | 4/1988 | Goldberg et al. | 367/46 |
| 4,745,550 | 5/1988 | Witkin et al. | 364/422 |
| 4,779,237 | 10/1988 | Bodine | 367/47 |
| 4,799,201 | 1/1989 | Nelson . | |
| 4,800,539 | 1/1989 | Corn et al. | 367/72 |
| 4,809,240 | 2/1989 | Mufti | 367/72 |
| 4,813,026 | 3/1989 | Quaglino | 367/29 |
| 4,829,487 | 5/1989 | Malloy | 367/40 |
| 4,839,869 | 6/1989 | Corcoran | 367/53 |
| 4,843,599 | 6/1989 | Bucker | 367/70 |
| 4,849,887 | 7/1989 | Skylas | 367/38 |
| 4,866,659 | 9/1989 | Lin et al. | 364/421 |
| 4,878,204 | 10/1989 | Black et al. | 367/53 |
| 4,881,207 | 11/1989 | Dubesset et al. | 367/31 |
| 4,884,248 | 11/1989 | Laster et al. | 367/73 |
| 4,894,807 | 1/1990 | Alam et al. | 367/15 |
| 4,916,615 | 4/1990 | Chittineni | 364/421 |
| 4,951,264 | 8/1990 | Yamamoto | 367/15 |
| 4,951,266 | 8/1990 | Hsu | 367/25 |
| 4,964,087 | 10/1990 | Widrow | 367/53 |
| 4,964,088 | 10/1990 | Chittineni | 367/45 |
| 4,970,699 | 11/1990 | Bucker et al. | 367/70 |
| 4,984,220 | 1/1991 | Bodine et al. | 367/68 |
| 5,008,861 | 4/1991 | Gallagher | 367/59 |
| 5,031,155 | 7/1991 | Hsu | 367/25 |
| 5,047,933 | 9/1991 | Harita et al. | 364/421 |
| 5,047,991 | 9/1991 | Hsu | 367/25 |
| 5,051,960 | 9/1991 | Levin | 367/24 |
| 5,056,066 | 10/1991 | Howard | 367/72 |
| 5,079,703 | 1/1992 | Mosher et al. | 364/421 |
| 5,105,356 | 4/1992 | Maute et al. | 364/422 |
| 5,130,951 | 7/1992 | Kingman | 367/82 |
| 5,132,938 | 7/1992 | Walters | 367/38 |
| 5,136,553 | 8/1992 | Kelly et al. | 367/52 |
| 5,153,858 | 10/1992 | Hildebrand | 364/421 |
| 5,181,171 | 1/1993 | McCormack et al. | 364/421 |
| 5,189,643 | 2/1993 | Wang et al. | 367/38 |
| 5,191,526 | 3/1993 | Laster et al. | 364/421 |
| 5,226,019 | 7/1993 | Bahorich | 367/74 |
| 5,245,587 | 9/1993 | Hutson | 367/100 |
| 5,265,192 | 11/1993 | McCormack | 395/22 |
| 5,295,086 | 3/1994 | Kumazawa et al. | 364/572 |
| 5,299,576 | 4/1994 | Shiba | 128/660.07 |
| 5,309,360 | 5/1994 | Monk et al. | 364/420 |
| 5,563,949 | 10/1996 | Bahorich et al. | 364/421 |

APPARATUS FOR SEISMIC SIGNAL PROCESSING AND EXPLORATION

CROSS-REFERENCE

This application is a continuation of a U.S. patent application that was filed on Dec. 12, 1994 under Ser. No. 08/353,934 and that is now U.S. Pat. No. 5,563,949.

TECHNICAL FIELD

This invention relates to the general subject of seismic exploration and, in particular, to apparatus and methods for identifying structural and stratigraphic features in three dimensions.

BACKGROUND OF THE INVENTION

Ordinary 2-D seismic data is acquired along lines (See lines 10 and 11 in FIG. 1) that consist of geophone arrays onshore or hydrophone streamer traverses offshore. Geophones and hydrophones act as sensors to receive energy that is transmitted into the ground and reflected back to the surface from subsurface rock interfaces 12. Energy is usually provided onshore by vibroseis vehicles which transmit pulses by shaking the ground at pre-determined intervals and frequencies on the surface. Offshore, airgun sources are usually used. Subtle changes in the energy returned to surface often reflect variations in the stratigraphic, structural and fluid contents of the reservoirs.

In 3-D seismic the principle is similar, however, lines and arrays are more closely spaced (See FIGS. 1 and 2) to provide more detailed sub-surface coverage. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

Once the data is processed, geophysical staff compile and interpret the 3-D seismic information in the form of a 3-D cube (See FIG. 4) which effectively represents a display of subsurface features. Using the data cube, information can be displayed in various forms. Horizontal time slice maps can be made at selected depths (See FIG. 5). Using a computer workstation an interpreter can slice through the field to investigate reservoir issues at different horizons. Vertical slices or sections can also be made in any direction using seismic or well data. Time maps can be converted to depth to provide a structural interpretation at a specific level.

Three-dimensional (3-D) seismic is being used extensively worldwide to provide a more detailed structural and stratigraphic image of subsurface reservoirs. Acceptance of 3-D seismic has accelerated during the last five years based on a proven track record that continues to grow. The 3-D payout has been measured by increased reserve estimates, cost savings from more accurate positioning of delineation and development wells, improved reservoir characterization leading to better simulation models, and the ability to predict more accurately future opportunities and problems during the production history of a field. More importantly, 3-D seismic has also been used as an exploration tool to reduce drilling risk in structurally complex areas and to predict reservoir quality in undrilled areas.

As good as 3-D seismic surveys and interpreters have become, improvements are needed.

In particular, seismic data has been traditionally acquired and processed for the purpose of imaging seismic reflections. Changes in stratigraphy are often difficult to detect on traditional seismic displays due to the limited amount of information that stratigraphic features present in a cross-section view. Although such views provide an opportunity to see a much larger portion of these features, it is difficult to identify fault surfaces within a 3-D volume where no fault reflections have been recorded. More importantly, seismic data is not known to have been acquired or used for the purpose of imaging seismic discontinuities instead of seismic reflections.

SUMMARY OF THE INVENTION

In accordance with the present invention, a method is disclosed for the exploration of hydrocarbons. The method comprises the steps of: obtaining a set of seismic signal traces distributed over a pre-determined three-dimensional volume of the earth; dividing the three-dimensional volume into a plurality of vertically stacked and generally spaced apart horizontal slices; dividing each of the slices into a plurality of cells that are arranged into laterally extending rows and columns and that have portions of at least three generally vertically extending seismic traces located therein; measuring across each of the cells the cross-correlation between one pair of traces lying in one vertical plane to obtain an in-line value and measuring the cross-correlation between another pair of traces lying in another vertical plane to obtain a cross-line value that are estimates of the time dip in an in-line direction and in a cross-line direction; combining the in-line value and the cross-line value to obtain one coherency value for each of the cells; and displaying the coherency values of the cells across at least one horizontal slice.

This technique is particularly well suited for interpreting fault planes within a 3-D seismic volume and for detecting subtle stratigraphic features in 3-D. This is because seismic traces cut by a fault line generally have a different seismic character than traces on either side of the fault. Measuring trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

Numerous other advantages and features of the present invention will become readily apparent from the following detailed description of the invention, the embodiments described therein, from the claims, and from the accompanying drawings.

DETAILED DESCRIPTION

Figure 1:
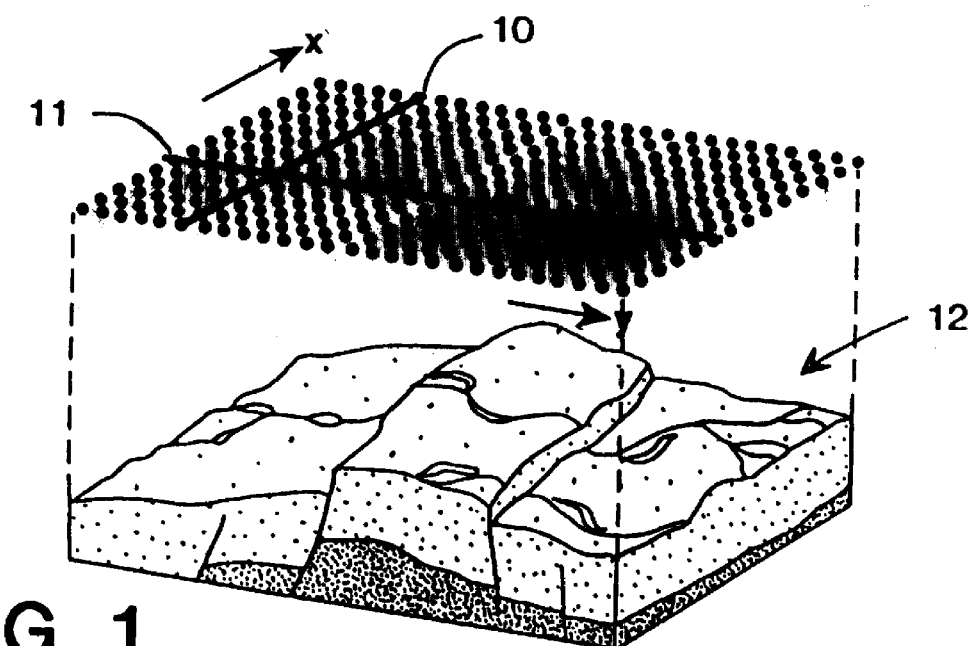
FIG. 1 illustrates an arrangement of geophones to obtain 3-D seismic data from the earth's subsurface for processing in accordance with the present invention.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment or algorithm so described.

Figure 7:
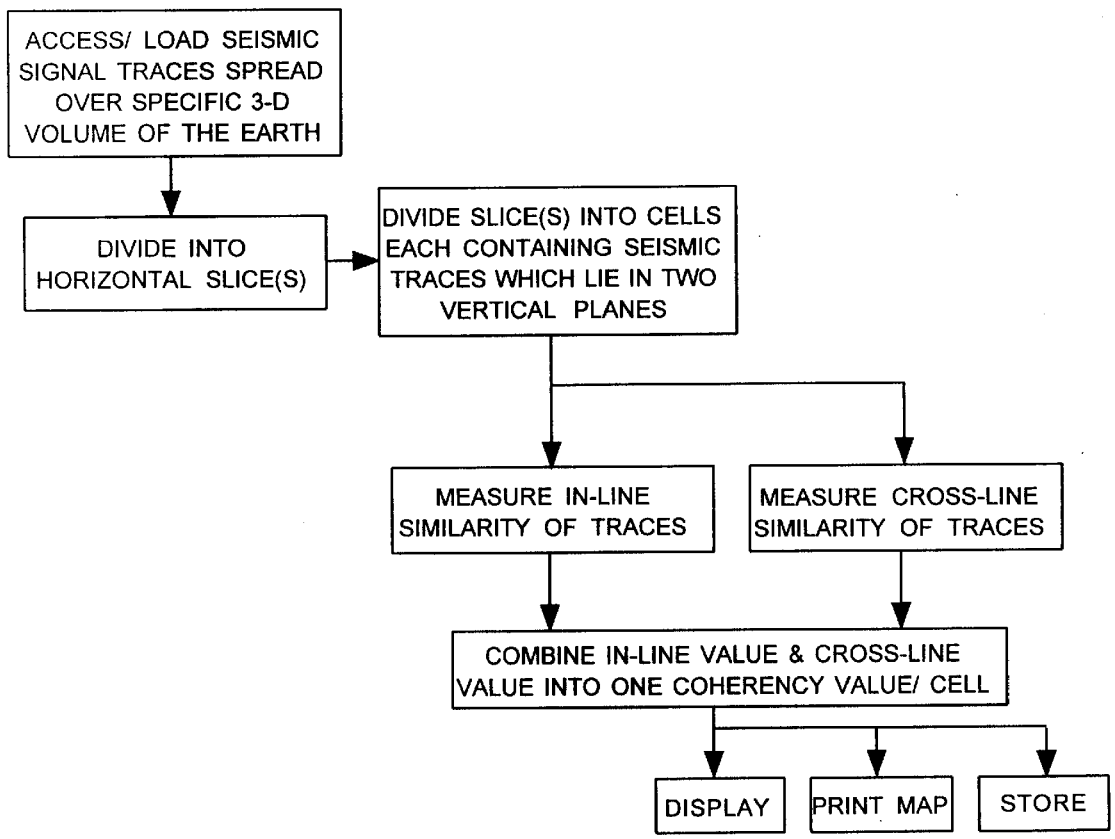
FIG. 7 is a simplified flow chart depicting the process of the invention.

Referring to FIG. 7, the first step is to obtain a set of seismic data in the form of seismic signal traces distributed over a three dimensional volume of the earth. Methods by which such data is obtained and reduced to digital form for processing as 3-D seismic data are well known to those skilled in the art.

The next step is to generate a "discontinuity cube." This is done by applying a coherency algorithm to the 3-D seismic data. This algorithm may take many forms. Whatever its form, its function is to compare the similarity of nearby regions of seismic data within the 3-D seismic volume. If a trace segment is similar to its neighbors (e.g., in the in-line and cross-line directions), it is assigned a low discontinuity value; if a trace segment is not similar to its neighbors, it is assigned a high discontinuity value.

Figure 2:
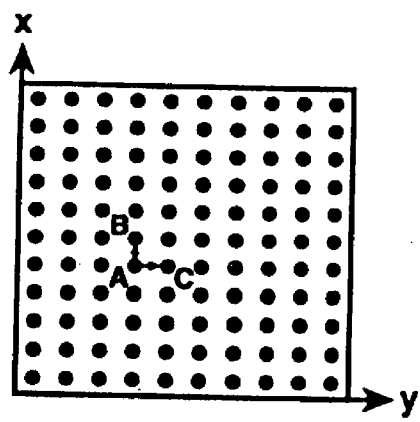
FIG. 2 is a plan view of the arrangement shown in FIG. 1.
Figure 3:
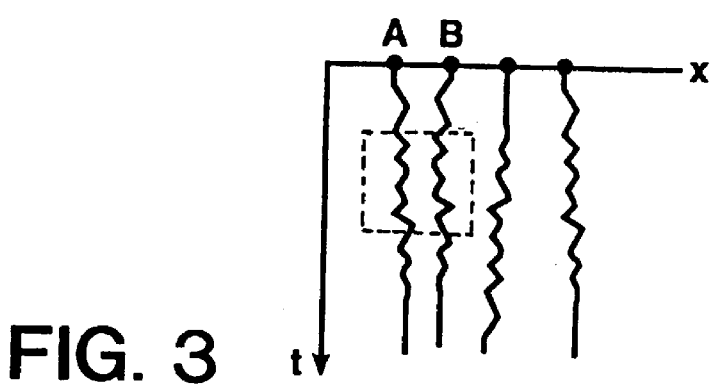
FIG. 3 is a representation of the seismic traces laying in a plane passing through one row of geophones shown in FIG. 2.
Figure 4:
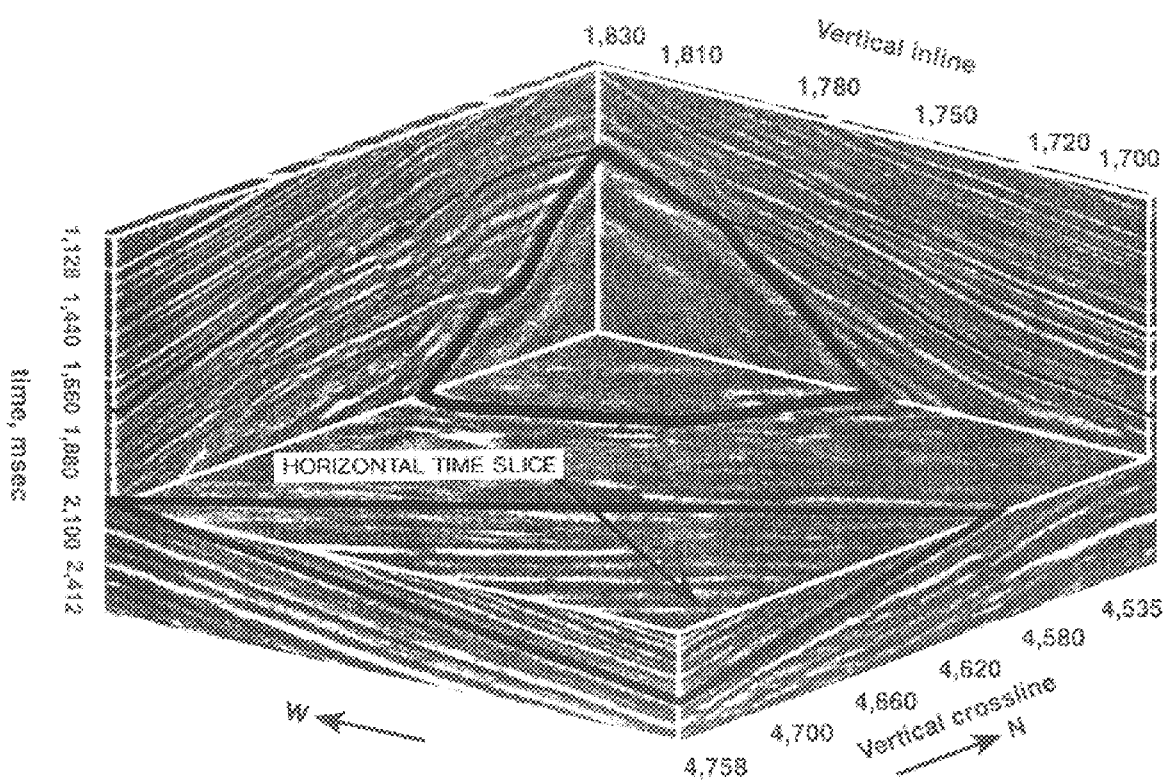
FIG. 4 is a pictorial representation of the information obtained from processing 3-D seismic data.
Figure 5:
FIG. 5 is a pictorial representation of a horizontal time slice of 3-D seismic data processed in accordance with the prior art.

FIG. 2 is a plan view of a portion of 3-D seismic volume. In order to measure discontinuity, a trace segment at one point A is compared to adjacent trace segments B and C. One way to compute trace similarity is described below.

The zero mean lagged cross-correlation in the in-line (x-direction) between trace $u(t, x, y)$ and $u(t, x+dx, y)$ with a lag time of "tlag" msec is defined as:

$$\rho_x(t, tlag) = \frac{\sum_{k=-w}^{k=+w} u(t+k, x, y)u(t+k+tlag, x+dx, y)}{\sqrt{a(t, x, y)a(t, x+dx, y)}}$$

where:

$$a(t, x, y) = \sum_{k=-w}^{k=+w} u^2(t+k, x, y)$$

and $$a(t, x+dx, y) = \sum_{k=-w}^{k=+w} u^2(t+k, x+dx, y)$$

are autocorrelations used to normalize the cross-correlation, and where w+w is the length in msec of the correlation window. It is important to choose w large enough so the assumption of zero mean is valid. Values on the order of a seismic wavelet are appropriate. Other methods of normalization may be used (e.g., product of the energies of the traces, etc.). In particular, cross correlation is one method of combining two waveforms to measure the similarities of the waveforms. Autocorrelation is a method of combining a waveform with itself. See Sheriff's "Encyclopedic Dictionary of Exploration Geophysics," Society of Exploration Geophysicists, Tulsa, Okla.

The zero mean lagged cross-correlation in the cross-line (y-direction) between trace $u(t, x, y)$ and $u(t, x, y+dy)$ with a lag time of tlag msec is defined as:

$$\rho_x(t, tlag) = \frac{\sum_{k=-w}^{k=+w} u(t+k, x, y)u(t+k+tlag, x, y+dy)}{\sqrt{a(t, x, y)a(t, x, y+dy)}}$$

where:

$$a(t, x, y+dy) = \sum_{k=-w}^{k=+w} u^2(t+k, x, y+dy)$$

The direction of apparent time dip in the x and y directions is estimated to be that lag (i.e., tlagx and tlagy) that has the greatest (i.e., most positive) cross-correlation. These values are $\rho_x(t, tlagx)$ and $\rho_y(t, tlagy)$.

Given the apparent dips (in msec/trace), it is a simple (but not necessarily accurate when dealing with noisy data) calculation to obtain dip and dip azimuth. More importantly, the concept of cross-correlation is extended to two dimensions by taking the geometric mean between the classical one dimensional cross-correlations:

$$\rho_{xy}(t, tlagx, tlagy) = \sqrt{\rho_x(t, tlagx)\rho_y(t, tlagy)}$$

This value (or seismic attribute) serves as a rather robust estimate or measure of signal discontinuity within geologic formations as well as signal discontinuities across faults and erosional unconformities. Other methods may be used to combine one dimensional cross-correlations(e.g., arithemitic mean, root mean square, average, median, square root of the sum of the squares, square root of the product of the squares, minimum, maximum, sum, product, etc.). The geometric mean has been found to perform quite satisfactorily. The main point is that inline and crossline information is combined to produce a "3D" measurement.

Computer Program

A simplified FORTRAN 77 program for performing these calculations is given below: Given a trace "x" from a 3-D seismic amplitude volume, and its two neighboring traces "y" (in the in-line direction) and "z" (in the cross-line direction), subroutine COH calculates an output trace "rho" containing coherence coefficients using a running window cross-correlation algorithm where:

"mins" and "maxs" are the minimum and maximum sample indices for all four traces;

"inwinl" is the window length in samples;

"nlags" specifies the number of lags (relative time shifts) to do each side of "0" in the cross-correlation; and "sr" is the sample interval in ms.

At each sample, subroutine CROSS calculates a series of normalized cross-correlation coefficients, returning the largest coefficients for each direction in "rho1" and "rho2". The time shift at which the maximum coefficients occur is returned in "tshf1" and "tshf2"; these times are not used. Subroutine COH is called repeatedly, once for every trace in the input seismic amplitude volume, to produce a new 3-D data volume or "coherency cube" containing coherence coefficients.

```
subroutine coh (x, y, z, rho, mins, maxs, iwinl, nlags, sr)
real x(mins:maxs), y(mins:maxs), z(mins:maxs)
real rho(mins:maxs)
ihwin = iwinl/2
doj = mins + ihwin, maxs − ihwin
```

-continued

```
      k = j - ihwin
      call cross (x(k), iwinl, y(k), iwinl, nlags, sr, rho1, tshf1)
      call cross (x(k), iwinl, z(k), iwinl, nlags, sr, rho2, tshf2)
      rho(J) = sqrt (rho1*rho2)
      enddo
      return
      end
      subroutine cross (x, nx, y, ny, lags, sr, peak, tshift)
      real x(0:nx-1), y(0:ny-1), sr, peak, tshift
      parameter (maxlags = 128)
      real g(-maxlags:+maxlags)
      double precision xx,yy
      nlags = max(0, min(lags, maxlags))
      tshift = 0.0
      peak = 0.0
      xx = 0.0
      yy = 0.0
      ks = 0
      do ix = 0, nx-1
      xx = x(ix)**2 + xx
      enddo
      if (xx.eq.0.0) return
      do iy = 0, ny-1
      yy = y(iy)**2 + yy
      enddo
      if (yy.eq.0.0) return
      do is = -nlags, + nlags
      g(is) = 0.0
      do it = 0,nx-1
      if (it-is.ge.0) then
      if (it-is.le ny-1) then
      g(is) = g(is) + x(it)*y(it-is)
      endif
      endif
      enddo
      if (abs(peak) .lt. abs(g(is))) then
      peak = g(is)
      ks = is
      endif
      enddo
      tshift = ks*sr
      peak = peak/sqrt (xx*yy)
      return
      end
```

Figure 6:
FIG. 6 is a pictorial representation of a horizontal time slice of 3-D seismic data processed in accordance with the present invention.
Figure 8:
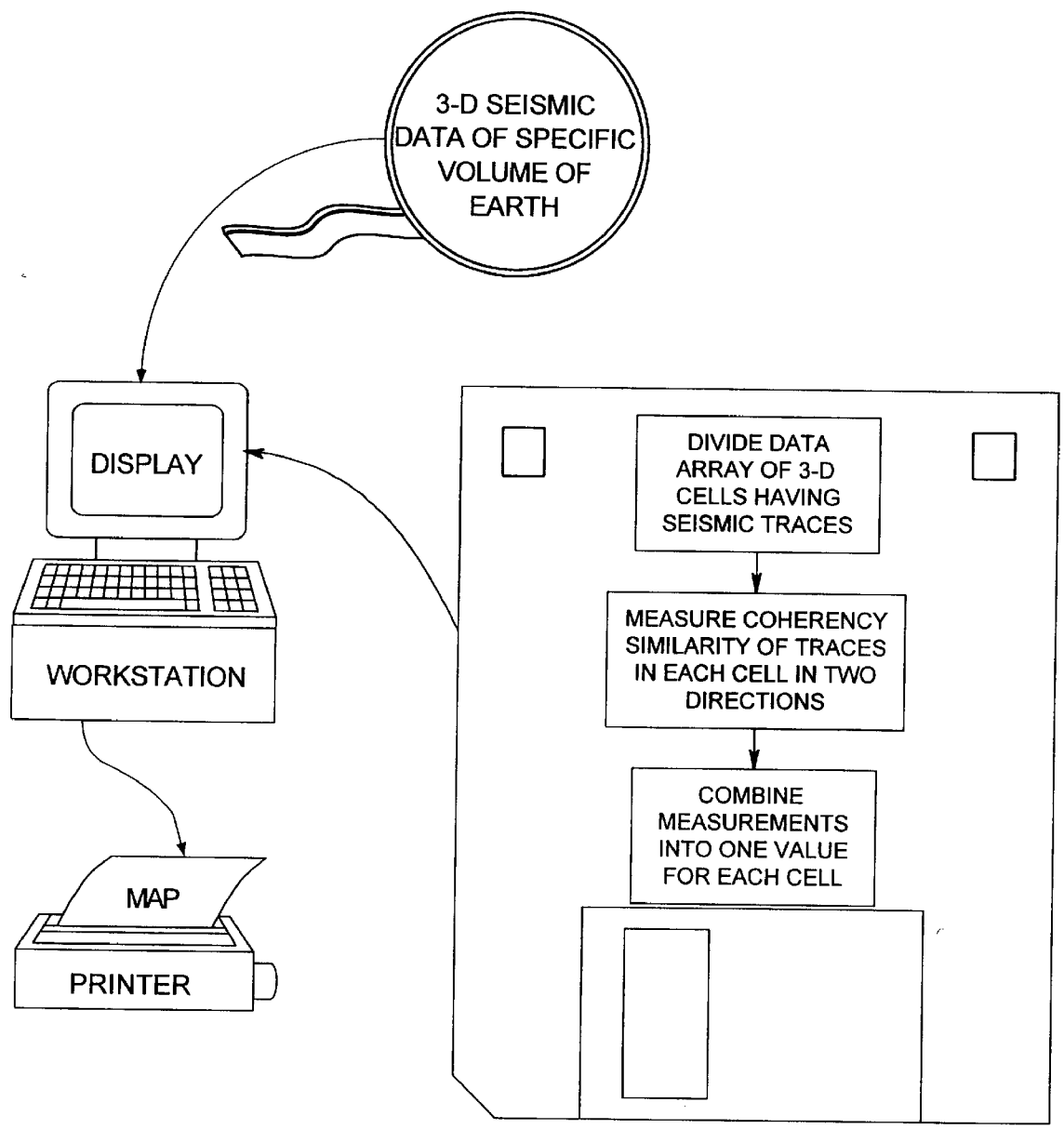
FIG. 8 is a schematic diagram depicting one embodiment of the invention.

Landmark and GeoQuest interpretive workstations, for example, can be used (See FIG.8) to view and interpret faults and stratigraphic features by loading the discontinuity cube as a seismic volume. Such workstations are commonly are used by those skilled in the art. The method of the invention can be conveniently loaded onto the workstation by means of a magnetic tape or disk which has been encoded with instructions for the computer to perform the above-described process. Visualization software (e.g., Landmarks's SeisCube software) may be employed to rapidly slice through the discontinuity volume to aid in understanding complex fault relationships. Discontinuity displays, including printouts in the form of seismic attribute maps, can reduce interpretation cycle time when used in selecting which seismic lines to interpret, enabling the interpreter to work around faults and poor data areas. In addition, subtle stratigraphic features and complex faulting which are not readily apparent on traditional seismic displays can be rapidly identified and interpreted. FIG'S. 5 and 6 are side by side comparisons of the same seismic information displayed and processed conventionally and in accordance with the present invention. Fault lines are readily apparent in FIG. 6.

Coherency maps have been run on several 3-D surveys. At depths of reasonable data quality, approximately 90% of the faults can be readily identified. Faults were identified on coherency maps which were very subtle on seismic sections, but clearly present on the coherency maps because of the robustness of the method and the map perspective of fault patterns. Since coherency maps can be run on uninterpreted time slices, the present invention offers a means to greatly accelerate mapping of the structural framework and to reveal details of fault relationships which would otherwise be interpreted only through tedious fault picking.

SPECIFIC EXAMPLES

2-D seismic coherence maps were generated along picked horizons and clearly identified shale diapirs in offshore Nigeria.

In offshore Gulf of Mexico, the technique readily identified diapiric structures.

On several coherence time slices, remarkable detail of stratigraphic features, such as abandoned river channels, mud flows, and submarine canyons, was displayed. On seismic sections, these features were sometimes apparent but, in some cases, were unidentifiable even with close scrutiny.

This is the first known method of revealing fault planes within a 3-D volume where no fault reflections have been recorded. Faults are often critical to the accumulation of oil. A fault may form a seal by cutting off a structural or stratigraphic feature so the oil is trapped against the fault. On the other hand, if the fault plane contains rubble that has not been cemented, it may form a conduit for fluids. This may allow the hydrocarbons to drift up the fault plane into the feature and be trapped in it or to escape from the feature by drifting up the fault plane out of it. Thus, fault lines can predict flow patterns in a reservoir and communication between injector and producing wells, for example.

Seismic discontinuities can also provide the needed link to enable reservoir prediction between the wells and establish reservoir continuity and flow patterns across a field. Coherency technology can be used for finding, identifying and mapping of subsurface features which are commonly associated with the entrapment and storage of hydrocarbons.

Coherency mapping of 3-D seismic is an extremely powerful and efficient tool for mapping both structure and stratigraphy. The new method is particularly sensitive to any lateral variation in wavelet character and therefore is particularly sensitive to the common causes of lateral variations in the wavelet (i.e., fault displacement or stratigraphic variations). This 3-D method analyzes a time-slice or horizon based interval and measures the maximum of the normalized cross-correlation in the in-line and cross-line directions.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Other algorithms may be used to measure the similarity of nearly regions of seismic data or to generate the "discontinuity cube." Thus, it should be understood that cross correlation is but one mathematical method that may be used to compute the coherence/similarity of seismic signals. Equivalent computations (e.g., covarience, etc) may be substituted for those specifically illustrated and described.Finally, it should be understood that the cross correlation, or equivalent, may or may not be normalized.

Also certain features of the invention may be used independently of other features of the invention. For example, stratigraphic features have been generally identified on time slices where dips were low; and consequently, the time window captured a narrow statigraphic section. In areas of higher dip, the method should work on picked horizons. Therefore, as a stratigraphic mapping tool, there is good reason to believe that new levels of detail can be mapped than previously, although this may require mapping of the horizon of interest.

As another example, while coherence slice maps by themselves are very powerful mapping tools, when used in conjunction with reconnaissance mapping of amplitudes and dip maps, there is promise of a technological milestone in mapping effectiveness for the Gulf of Mexico or similar basins with 3-D seismic. It is believed that detailed mapping of structure and stratigraphy will be accelerated by mapping in a map view and less by traditional line by line picking. Interpretation in a map view of "reconnaissance" data offers significant improvement in quality and quantity of interpretation.

Thus it will be appreciated that various modifications, alternatives, variations, and changes may be made without departing from the spirit and scope of the invention as defined in the appended claims. It is, of course, intended to cover by the appended claims all such modifications involved within the scope of the claims.

We claim:

1. In a computer workstation wherein 3-D seismic data is read into memory and divided into an array of analysis cubes, wherein each cube has at least a portion of at least three separated seismic traces located therein, and wherein the computer is used to transform such data into a display of seismic attributes, the computer CHARACTERIZED BY performing a process comprising the steps of:

(1) measuring in each of said cubes the coherency/similarity of said at least three traces relative to two pre-determined axes; and (2) recording said coherency/similarity of said cubes in a form for displaying a two-dimensional map of subterranean features to identify subsurface features commonly associated with the entrapment and storage of hydrocarbons.

2. The computer workstation of claim 1, where in step (1) the computer is programmed to measure said coherency/similarity of said cubes as a function of the cross-correlation between two traces along one axis and the cross-correlation between two traces along an axis that is perpendicular to said one axis.

3. The computer workstation of claim 2, where in step (1) the computer is programmed to measure said coherency/similarity of said cubes as a function of the greatest cross-correlation in each of said two axes.

4. The computer workstation of claim 3, where in step (1) the computer is programmed to measure said coherency/similarity of said cubes as a function of the geometric mean of the greatest cross-correlation in each of said two axes.

5. The computer workstation of claim 1, wherein the workstation comprises a video display; wherein said cubes are divided in a plurality of vertically separated horizontal arrays; and wherein the computer performs the step of depicting on said video display the coherencies/similarities of successive vertically separated horizontal arrays to identify relative space and time invarient features.

6. The computer workstation of claim 1, where in step (1) the computer is programmed to measure said coherency/similarity of said cubes by:

(i) determining the cross-correlation in an in-line direction between a first trace and at least a second trace and determining the cross-correlation in an cross-line direction between said first trace and at least a third trace;

(ii) identifying at least one of said cross-correlations in said in-line direction and at least one of said cross-correlations in said cross-line direction in accordance with a pre-determined criteria; and (iii) combining said identified cross-correlation in said in-line direction and said identified cross-correlation in said cross-line direction.

7. The computer workstation of claim 6, wherein the computer is programmed to perform step (ii) by identifying the most positive of said cross-correlations in said in-line direction and the most positive of said cross-correlations in said cross-line direction.

8. The computer workstation of claim 7, wherein the computer is programmed to perform step (iii) by computing the geometric mean of said identified cross-correlations in said in-line direction and in said cross-line direction.

9. The computer workstation of claim 1, where in step (1) the computer is programmed to measure said coherency/similarity of said cells by: determining the zero mean lagged cross-correlation in an in-line direction between a first trace and at least a second trace; and determining the zero mean lagged cross-correlation in a cross-line direction between said first trace and at least a third trace.

10. The computer workstation of claim 1, wherein the workstation comprises a video monitor; and wherein said process further includes the step of displaying said recorded coherency/similarity values of said cubes on said video monitor.

11. In a computer workstation wherein 3-D seismic data obtained over a pre-determined three-dimensional volume of the earth is accessed and divided into an array of three-dimensional cells, wherein each cell has at least a portion of at least three separated seismic traces located therein, and wherein such data is transformed into a video display of seismic attributes, a computer programmed to perform a process comprising the steps of:

(1) measuring in each of said cells the cross-correlation between at least two cross-line traces and the cross-correlation between at least two in-line traces;

(2) identifying for each cell one cross-correlation in said in-line direction and one cross-correlation in said cross-line direction in accordance with a pre-determined criteria;

(3) combining said identified cross-correlation in said in-line direction and said identified cross-correlation in said cross-line direction for each of said cells; and (4) displaying said combined cross-correlations of said cells in the form of a two-dimensional map.

12. The computer workstation of claim 11, wherein the computer is programmed to arrange said cells in a plurality of vertically separated horizontal arrays; and wherein said process further includes the step of displaying said combined cross-correlations of successive vertically separated horizontal arrays.

13. The computer workstation of claim 11, wherein each cell comprises a plurality of traces in said in-line direction and in said cross-line direction, and wherein the computer is programmed to perform step (2) by identifying the most positive of said cross-correlations in said in-line direction and the most positive of said cross-correlations in said cross-line direction.

14. The computer workstation of claim 11, wherein the computer is programmed to perform step (3) by computing the geometric mean of said identified cross-correlations in said in-line direction and in said cross-line direction.

15. The computer workstation of claim 11, wherein the computer is programmed to perform step (1) by: determining the zero mean lagged cross-correlation in an in-line direction between a first trace and at least a second trace; and determining the zero mean lagged cross-correlation in a cross-line direction between said first trace and at least a third trace.

16. A workstation wherein seismic data obtained over a pre-determined three-dimensional volume is read into a memory, wherein a computer arranges such data into three-dimensional analysis cells, wherein each cell has at least three seismic traces located therein, and wherein the computer is used to transform such information into a display of seismic attributes, the computer being instructed to perform a process comprising the steps of:

(1) measuring, in each of the cells, a cross-correlation in one direction between a first trace and at least a second trace, and a cross-correlation in at least one other direction between said first trace and at least a third trace;

(2) identifying, in conformance with a predefined criteria for the cells, one of said cross-correlations in said one direction and one of said cross-correlations in said at least one other direction;

(3) combining said identified two cross-correlations to obtain one measurement that characterizes the coherency of the cell;

(4) displaying said combined cross-correlations of the cells in the form of a map.

17. The computer workstation of claim 16, wherein step (1) is performed by: measuring the zero mean lagged cross-correlation in said one direction between said first trace and said at least said second trace; and measuring the zero mean lagged cross-correlation in said at least one other direction between said first trace and said at least said third trace.

18. The computer workstation of claim 16, wherein step (1) is performed by measuring the cross-correlation in an in-line direction between said first trace and at least said second trace; and measuring the cross-correlation in a cross-line direction between said first trace and at least said third trace.

19. The computer workstation of claim 16, wherein step (2) is performed by identifying the most positive of said cross-correlations in said one direction and identifing the most positive of said cross-correlations in said at least one other direction.

20. The computer workstation of claim 19, wherein step (3) is performed by computing the geometric mean of said most positive cross-correlation in said one direction and said most positive cross-correlation in said at least one other direction.

* * * * *

UNITED STATES PATENT AND TRADEMARK OFFICE
CERTIFICATE OF CORRECTION

PATENT NO.  : 5,838,564
DATED       : November 17, 1998
INVENTOR(S) : Michael S. Bahorich, Steven L. Farmer It is certified that error appears in the above-identified patent and that said Letters Patent is hereby corrected as shown below:

| Col. | Line | |
|------|------|---|
| 4  | 66 | "doj = mins"  should read --do j = mins-- |
| 5  | 27 | "if (it-is.le ny-1) then"  should read --if (it-is .le. ny-1) then-- |
| 6  | 53 | "the similarity of nearly regions"  should read --the similarity of nearby regions-- |
| 10 | 17 | "one direction and identifing"  should read --one direction and identifying-- |

Signed and Sealed this

Fourth Day of May, 1999

Q. TODD DICKINSON

Attest:

Attesting Officer

Acting Commissioner of Patents and Trademarks